United States Patent [19]
Humbert et al.

[11] 3,917,613
[45] Nov. 4, 1975

[54] ESTERS OF MENTHOL AND 2-PYRROLIDONE OR PIPERIDINE CARBOXYLIC ACIDS

[75] Inventors: Francoise Ernestine Lucie Humbert, Paris; Gerard Guth, Franconville, both of France

[73] Assignee: Lever Brothers Company, New York, N.Y.

[22] Filed: July 30, 1973

[21] Appl. No.: 383,958

[30] Foreign Application Priority Data
Aug. 7, 1972   United Kingdom............... 36802/72

[52] U.S. Cl.. 260/293.65; 260/295 R; 260/295.5 R; 260/326.45; 260/343.5; 260/343.6; 260/345.8; 260/347.5; 424/48; 424/49; 424/54; 424/263; 424/266; 424/267; 424/274; 424/279; 424/283; 424/285; 426/3; 426/65; 426/175
[51] Int. Cl............................................. C07d 29/24

[58] Field of Search.................. 260/293.65, 326.45; 424/54

[56] References Cited
FOREIGN PATENTS OR APPLICATIONS
1,156,389    6/1969   United Kingdom............ 260/326.45

Primary Examiner—Henry R. Jiles
Assistant Examiner—S. D. Winters
Attorney, Agent, or Firm—Louis F. Kline, Jr.

[57] ABSTRACT

Novel esters of menthol and heterocyclic carboxylic acids such as 2-pyrrolidone-5-carboxylic acid, pipecolic acid, nipecotic acid and isonipecotic acid can be incorporated into products for oral use, such as a dentifrice, to give an effect of freshness which lasts longer than that of menthol.

5 Claims, No Drawings

ESTERS OF MENTHOL AND 2-PYRROLIDONE OR PIPERIDINE CARBOXYLIC ACIDS

This invention relates to new flavour compounds and the flavouring of preparations for human consumption and cosmetic use. More particularly it relates to flavour compositions and oral preparations such as dentifrices, which impart a fresh and cool sensation.

Generally a fresh and cool sensation is achieved by the addition of menthol or menthol containing flavour compositions.

However, the addition of the menthol, menthol-containing raw materials such as natural peppermint oils or flavour compositions containing these compounds, is often not possible because either the peppermint flavour in the products will dominate or at high concentrations the burning effect is produced.

It has now been found that the sensation of freshness imparted by flavour compositions and by preparations for human consumption and cosmetics, in which these flavour compositions can be used, in particular oral use such as in dentifrices, can be improved if in these compositions and products are included one or more esters of menthol and heterocyclic carboxylic acids having the general formula:

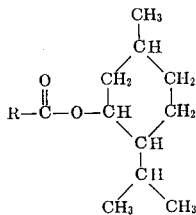

wherein
R represents:
a 2-, 3- or 4-pyridyl group or
a radical derived, by eliminating one H atom, from a saturated 5- or 6-ring compound represented by the general formula:

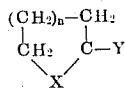

wherein
n represents 1 or 2,
X represents an oxygen atom or an imino group, and
Y represents an oxo group or two hydrogen atoms.

As useful heterocyclic acid esters can be mentioned the esters of 2-pyrrolidone 3-, 4- or 5-carboxylic acids, isonicotinic acids as well as nicotinic acid and picolinic acid; further pipecolic acid, nipecotic acid, isonipecotic acid, tetrahydrofuroic acids, 2-butyrolactone 3-, 4- or 5-carboxylic acids and tetrahydropyrollic acids.

The compounds according to the invention are new compounds except the menthol esters of the tetrahydropyrrolic acids. They produce an effect on the perception of freshness similar to menthol; however, without the undesirable predominance of flavour or undesirable side effects, such as burning.

Comparing menthol and the compounds according to the invention, the sensation of freshness lasts much longer in the case of the compounds according to the invention than in the case of menthol.

The preferred compounds for use in flavour compositions and dentifrices are menthyl-2-pyrrolidone-5-carboxylic acid esters.

The compounds according to the invention are prepared according to classic methods of organic chemistry either by direct esterification of menthol with the acids in question using catalysts and suitable solvents, or by transesterification starting from menthol and methyl esters of the acids in question and in some cases starting from unsaturated acids; the unsaturated heterocyclic esters obtained have to be hydrogenated.

The heterocyclic esters or the methyl esters to be used in the synthesis may be prepared in a manner known per se. Pyrrolidone carboxylic acid, for example, can be prepared by heating glutamic acid at 180°C as described in J. Am. Chem. Soc., 1942, p. 1021. Also butyrolactone-5-carboxylic acid can be prepared from glutamic acid by the well-known desamination method followed by lactonisation according to Ber. 94. 2106 (1961). In these syntheses can be used either menthol, that is the stereo isomer with all the substituents in equatorial position, or the mixture of menthol, isomenthol, neomenthol and neoisomenthol.

Flavour compositions containing a sufficient amount of the compounds according to the invention are very useful for activating the cold-sensitive receptors of the mucous membranes in products for oral use.

By the term "products for oral use" as used herein is meant a product in powder, paste or liquid form which on being used is retained for a time sufficient to contact the surface and the internal mucous membrane of the oral and nasal cavities and the pharynx. Such products include, for example, mouth washes, dental and throat lozenges, gargles, chewing gum, dental creams or toothpastes, toothpicks, dental tablets and powders and topical solutions for application in dental surgery, cough-mixtures, anti-acid and digestion promoting preparations and oral analgesics.

Furthermore, as examples of compositions falling within the scope of the invention can be mentioned:

edible compositions consisting of an edible basis, a flavour or colorant, and a stimulant of the cold-sensitive receptors as hereinbefore defined, such as chocolate, bonbons, ice-creams, jellies, jams, margarines;

drinks consisting of a drinkable basis, a flavour or a colorant and a stimulant of the cold-sensitive receptors as hereinbefore defined, such as alcoholic or non-alcoholic drinks, e.g. fruit juices, lemonades, etc.

The amount of a compound according to the invention which can be mixed with other ingredients to form a flavour composition is normally from about 10 to about 30% by weight of this composition. Furthermore, the amount of this flavour composition so prepared which can in turn be incorporated in a product for oral use or human consumption is usually from about 0.5 to about 3%, preferably 1 – 2% by weight of the product.

Hence it follows that product will contain from about 0.05 to about 0.9% preferably 0.1 to 0.6% by weight of the compound. It is also possible to incorporate in the product a compound according to the invention together with only a minor proportion of one or more other flavour ingredients, or indeed in the absence of other such ingredients.

The compounds or flavour compositions according the the invention are preferably used in dentifrices and toothpastes.

Dentifrices and toothpastes in addition to flavours characteristically contain other ingredients including a base composition comprising a substantially water-insoluble polishing material, a surface-active agent, various additives and one or more compounds according to the invention, preferably menthyl-2-pyrrolidone-5-carboxylic acid ester.

Any suitable water-insoluble polishing material or abrasive may be employed in the preparation of the dentifrices according to the invention. As suitable materials may be used, for example, calcium carbonate, dicalcium phosphate, tricalcium phosphate, natural or synthetic silicas (e.g. the silicaxerogels as described in U.S. Pat. No. 3,538,230), alumina, as e.g. mentioned in British patent 1,188,353, calcium pyrophosphate, thermosetting resins, such as ureaformaldehyde or melamine-formaldehyde resins, insoluble sodium metaphosphate, or suitable mixtures thereof.

In general the content of polishing material is variable, but will generally be up to about 95% by weight of the total composition. In the case of a dental cream, the content of polishing material will generally be about 20 to 75%, preferably between 45 and 55%, whereas in tooth powders and dental tablets, the content of polishing material will generally be higher, such as about 70–95% by weight. The surface-active material may be anionic, nonionic, ampholitic or cationic by nature. Also mixtures thereof with one or more other members of the same group or one or more of these groups of surface-active materials may be used.

The surface-active materials are preferably used in the form of their water-soluble salts such as salts of alkali metals (sodium, potassium, etc.) or of ammonium, and also in the form of salts of nitrogen-containing bases like the low molecular weight alkanolamines, such as mono-, di- and tri-ethanolamines, etc. It is also possible to use mixtures of different salts.

The content of surface-active material is in general from 0.01 to 10% by weight and preferably from 0.5 to 5% by weight of the total composition. In dental cream preparations the liquid and solid constituents of the composition should be in proportions such that a creamy mass of the desired consistency is formed which is extrudable from an aerosol container or a collapsible tube. In this case a carrier is used, for example glycerol or sorbitol, and a binder or thickener, such as gum tragacanth, gum karaya, gum arabic, sodium carboxymethylcellulose, hydroxyethylcellulose, polyvinyl pyrrolidone, starch, Irish moss, alginates, bentonite and colloidal magnesium aluminium silicate.

The amount of thickeners is generally up to 10% and preferably 0.2 to 5% by weight of the total composition.

Furthermore, whiteners, such as titanium dioxide; optical brighteners; bleaching agents; various ammoniated ingredients, such as urea, diammonium phosphate; astringents; chloroform; humectants, such as propylene glycol or other polyhydric alcohols; film-forming substances, such as silicones; enzymes; harmless colouring materials; germicides, such as dichloro- or hexachlorophene vitamins, such as those of the B-group; preservatives, such as sodium benzoate; antibiotic agents; corrosion inhibitors; chlorophyll derivatives; cariostatic agents, such as stannous fluoride, sodium monofluorophosphates, alkali metal fluorides, etc. may also be incorporated in the compositions according to the present invention.

The amount of cariostatic or antimicrobial agents in dental pastes is generally from 0.01 to 1% and preferably from 0.02 to 0.5% by weight of the total composition.

In addition to the flavouring composition, small amounts of sweetening agents, such as saccharin, dextrose, levulose and sodium cyclamate, are also incorporated in the compositions according to the present invention. The amount is generally from 0.01 to 5% by weight of the total composition.

The pH of the oral compositions according to the present invention must be within a range practicable for use. This range is from about 4 to 8, preferably of about 4.5 to 6.5. Acidifying agents which are suitable for use in the oral cavity can be added to the composition to adjust and maintain the pH within the desired range such as citric acid.

The heterocyclic carboxylic acid esters such as e.g. the menthyl pyrrolidone carboxylic acid esters will usually be added to the flavour composition. To the oral products they may be added at any stage of its manufacture either in solution or in solid form. They may be used in encapsulated form or absorbed on a carrier.

The sensation of freshness of the products of the invention can be evaluated by tasting the flavour compositions direct or on a piece of sugar or in the final products with test panels.

The following examples illustrate the invention.

EXAMPLE I

Preparation of menthyl pyrrolidone carboxylic acid ester 64.5 g L-pyrrolidone carboxylic acid prepared according to J. Am. Chem. Soc. 1942, page 1021, 120 g natural menthol, 700 ml benzene and 6.4 g sulphonic toluene are heated to boiling point for 40 hours.

The organic solution is then washed with water and carbonate and thereafter concentrated. The nonreaction natural menthol is entrained by the water vapour and the residue is distilled under reduced pressure.

In this way 94 g ester is obtained, boiling at 174°–180° under 0.025 mm instead of L-pyrrolidone carboxylic acid, DL-pyrrolidone carboxylic acid may be used, resulting in a directly crystallising isomeric ester.

The same method of preparation can be used starting from liquid menthol which is a mixture of stereoisomers. The result is a mixture of stereoisomeric esters.

EXAMPLE II

Preparation of menthyl picolinate
Picolinic acid

This product has been prepared according to the method described in Organic Synthesis giving a yield of 61%.

Methyl picolinate

Picolinic acid chlorohydrate is first prepared by dissolving picolinic acid in anhydrous ether and by passing a current of dry hydrochloric acid gas through it. The chlorohydrate melts at 226°–227°C (decomp.).

The chlorohydrate is washed with ether and thoroughly dried.

The esterification is carried out by refluxing a mixture of 35 g chlorohydrate, 91 g methyl alcohol and 43.4 g concentrated sulphuric acid for 5 hours. The methanol is then removed under vacuum and neutralised with sodium carbonate in the presence of a minimum of water. Finally extraction is carried out with benzene, ether optionally being added if an emulsion is formed. Drying, concentration and distillation are carried out under reduced pressure.

$Bp_{18\ mm} = 124°–126°C$
Yield 15.5 g (51%)

EXAMPLE III

Preparation of menthyl picolinate

The trans-esterification was carried out under conditions identical with those described for menthyl pyrrole-N carboxylate.

Starting from 30 g methyl ester (0.22 M) and 50 g menthol (0.32 M), 24.5 g ester were obtained in the presence of some milligrams of sodium.

$Bp_{0.3} = 154°C$
Yield 43%

Analysis: $C_{16}H_{23}O_2N = 261.424$

|  | C | H | N |
|---|---|---|---|
| Calculated % | 73.51 | 8.87 | 5.38 |
| Found % | 73.86 | 9.09 |  |

Infra-red Spectra $\gamma$ cm$^{-1}$ = 3050 (=C—H), 2,850–2,950 (CH$_2$/CH$_3$), 1,700–1,730 (C=O), 1,570–1,580 (C=C), 705–745 ($\delta$ C=C).

EXAMPLE IV

Preparation of menthyl pipecolate 9 g picolinate in solution are hydrogenated in 90 ml acetic acid and 90 ml pure alcohol in the presence of 27 drops of a 31.5 g/100 solution of ferric chloride. Catalyst: 1.3 g Adams platinum. Half of the theoretical volume is absorbed in about 2 hours. 36 ml of a solution of 0.19 g hydrochloric acid per ml ethyl alcohol, 27 drops of a solution of ferric chloride and 1.3 g catalyst were then added. An absorption of hydrogen close to the theoretical amount (2,170 ml for 2,340) was then observed. The catalyst is filtered and the product is washed with sodium bicarbonate, extracted by petrol ether, washed with water, dried, concentrated and distilled under vacuum. 6 g pipecolate were obtained.

$Bp_{0.4} = 112°–114°C$
Yield 66%

EXAMPLE V

Preparation of menthyl nicotinate 265 g (1.7 M) menthol were heated with 4.6 g (0.2 Ag) sodium until complete dissolution of the metal was achieved.

13.7 g (0.1 M) methyl nicotinate (commercially available product) were then added and heating was carried out at 85°–90°C for 2 hours at a subatmospheric pressure generated by a water air jet pump. Water and methylene chloride were added. The organic phase was collected, dried, concentrated and distilled. After distillation of the menthol ($Bp_{10}$ = 98°C), 13 g nicotinate were obtained.

$Bp_{0.5} = 168°C$
Yield 50%

Analysis: $C_{16}H_{23}O_2N = 261.352$

|  | C | H | N |
|---|---|---|---|
| Calculated % | 73.52 | 8.87 | 5.36 |
| Found % | 73.63 | 8.89 | 5.20 |

EXAMPLE VI

Preparation of menthyl nipecotate 6 g of the aforementioned ester were dissolved in a mixture of 60 ml acetic acid and 60 ml ethanol. 900 mg platinum oxide and 18 drops of a solution of 31.5% ferric chloride in ethanol were added. Hydrogenation was carried out under normal pressure and temperature. After absorption of 400 ml hydrogen, 24 ml of an ethanolic hydrochloric acid solution of 0.19 g per ml were added. The theoretical absorption of hydrogen was then observed. The process took 11 hours. The product was extracted in the usual way.

Distillation $Bp_{0.5} = 139°–140°C$
Yield 4 g (65%)

Analysis: $C_{16}H_{29}O_2N = 267.40$

|  | C | H | N |
|---|---|---|---|
| Calculated % | 71.86 | 10.93 | 5.24 |
| Found % | 71.73 | 10.94 | 5.29 |

Melting point = 51–53°C

EXAMPLE VII

Preparation of menthyl isonicotinate 49.2 g isonicotinic acid (0.4 M), 96 g menthol, 81 g p-toluene sulphonic acid and 150 ml toluene were refluxed for 36 hours according to a usual method. 90 g isonicotinate were obtained after extraction and distillation.

$Bp_{0.5} = 163°C$
Yield 86%

Analysis: $C_{16}H_{23}O_2N$

|  | C | H | N |
|---|---|---|---|
| Calculated % | 73.52 | 8.87 | 5.36 |
| Found % | 73.40 | 8.82 | 5.44 |

EXAMPLE VIII

Preparation of menthyl isonipecotate 6 g isonicotinate were hydrogenated according to the usual technique in the presence of 60 cc acetic acid, 60 cc ethanol, 900 mg platinum oxide and 18 drops of a ferric chloride solution.

After 3 hours' hydrogenation, 24 cc of a chlorohydrous solution, 18 drops of a ferric chloride solution and 900 mg catalyst were added as in the case of the nipecotate.

The absorption is complete in 8 hours.

After the major part of the alcohol has been removed, the mixture is extracted with bicarbonate, extracted with ether, dried and the solvent is removed. A solid was obtained that was recrystallised in hexane.

Yield 4.5 g (73%)
Melting point = 62.5°–63°C

Analysis: $C_{16}H_{29}O_2N = 267.4$

| | C | H | N |
|---|---|---|---|
| Calculated % | 71.86 | 10.93 | 5.24 |
| Found % | 71.94 | 11.31 | 5.15 |

EXAMPLE IX

Preparation of menthyl-2-butyrolactone-5-carboxylate

Butyrolactone-5-carboxylic acid 60 g glutamic acid were dissolved in a solution of 84 ml concentrated hydrochloric acid and 160 ml water. This solution was cooled to 0°–5°C. Whilst the temperature was maintained between 0° and 5°C, a solution of 28 g sodium nitrate in 60 ml water was then added dropwise. Stirring was carried out for some time after this first addition and then a new fraction consisting of 14 g nitrite in 30 ml water was added. Stirring was continued for 5 hours. During the whole process the temperature was kept between 0° and 5°C. The water was removed under reduced pressure (rotary evaporator) and extracted with ethyl acetate. The solution was dried ($SO_4Na_2$), concentrated and the residue distilled.

$Bp_{0.02} = 160°–164°C$

Yield 21 g (40%)

Melting point = 50°C

Acid value: Calculated 430; Found 425

Menthyl-2-butyrolactone-5-carboxylate

A mixture of 6.5 g (0.05 M) of the aforegoing acid, 12 g menthol, 70 ml benzene and 0.6 g p-toluene sulphonic acid was refluxed for two hours. By applying the usual methods 6.5 g ester were obtained that crystallise.

$Bp_{0.03} = 138°–140°C$

Yield 50%

Melting point = 68°C

Recrystallisation was carried out two times in hexane.

Analysis: $C_{15}H_{24}O_4 = 268.357$

| | C | H |
|---|---|---|
| Calculated % | 67.14 | 9.01 |
| Found % | 67.17 | 9.06 |

Infra-red Spectra $\gamma$ cm$^{-1}$ = 2,850–2,950 ($CH_2/CH_3$), 1,790–1,740 (C=O).

EXAMPLE X

Preparation of menthyl tetrahydro-2-furoate

This product was obtained by esterification of 11.2 g (0.1 M) furoic acid (Organic Synthesis I, 276) with 24 g (0.15 M) menthol in the presence of 5 g p-toluene sulphonic acid in solution in a mixture of 140 ml benzene and 60 ml toluene. Boiling was continued for 34 hours. The usual technique gave 14 g ester.

$Bp_{0.5} = 126°C$

Analysis: $C_{15}H_{22}O_3 = 250.341$

| | C | H |
|---|---|---|
| Calculated % | 71.97 | 8.86 |
| Found % | 71.91 | 8.91 |

Infra-red Spectra $\gamma$ cm$^{-1}$ = 2,850–2,950 ($CH_2/CH_3$), 3,100 (=C—OH), 1,710–1,730 (C=O), 1,580 (C=C), 760 ($\delta$C=C).

Menthyl tetrahydro-2-furoate 5 g furoate were dissolved in 50 ml methanol and hydrogenated under normal pressure and temperature in the presence of 2.5 g of 5% rhodium on alumina. The product thus absorbs 830 ml hydrogen (theoretically 895 ml). It was distilled for analysis.

$Bp_2 = 129°–130°C$

Analysis: $C_{15}H_{26}O_3 = 254.373$

| | C | H |
|---|---|---|
| Calculated % | 70.83 | 10.30 |
| Found % | 70.86 | 10.31 |

Infra-red Spectra $\gamma$ cm$^{-1}$ = 2,850–2,950 ($CH_2/CH_3$), 1,740 (C=O).

EXAMPLE XI

Flavour compositions

| A. Aniseed flavour | % by weight |
|---|---|
| Natural anethole | 23 |
| Synthetic anethole | 22 |
| Ceylon cinnamon oil | 3 |
| Bulgarian mint oil | 27 |
| Natural menthol crystal | 10 |
| Menthyl isonipecotate | 15 |

A.I. Instead of menthyl isonipecotate, menthyl-2-pyrrolidone-5-carboxylate is used in composition A.

| B. Spearmint flavour | % by weight |
|---|---|
| Spearmint U.S.A. oil | 64 |
| Bulgarian mint oil | 8 |
| Natural menthol | 6 |
| Resinous benzoin | 0.1 |
| Cloves oil | 1.3 |
| Ceylon cinnamon oil | 0.1 |
| Anethole from Chinese aniseed | 3.3 |
| Menthyl nipecotate | 17 |
| Sweet fennel oil | 0.2 |

B.I. Instead of menthyl nipecotate, menthyl pipecolate is incorporated in composition B.

| C. Peppermint flavour | % by weight |
|---|---|
| Bulgarian mint oil | 32 |
| Arvensis mint oil | 34 |
| Menthol | 5 |
| Natural anethole | 4 |
| Wintergreen | 1 |
| Thymol | 2 |
| Essence of cloves | 0.2 |
| Vanilla tincture | 1.7 |
| Ceylon cinnamon oil | 0.1 |
| Menthyl-2-pyrrolidone-5-carboxylate | 20 |

C.I. Instead of menthyl-2-pyrrolidone-5-carboxylate, menthyl tetrahydrofuroate is introduced in composition C.

EXAMPLE XII

| Toothpaste | Parts by weight | |
|---|---|---|
| | A | B |
| Silica | 18 | 18 |
| Glycerol | 58 | 58 |
| Sodium saccharinate | 0.15 | 0.15 |
| Sodium lauryl sulphate | 1.5 | 1.5 |
| Flavor | | |
| Bulgarian mint oil | 0.32 | 0.32 |
| Arvensis mint oil | 0.34 | 0.34 |
| Natural menthol | 0.05 | 0.05 |
| Badian anethole | 0.04 | 0.04 |
| Wintergreen | 0.01 | 0.01 |
| 1% Thymol solution | 0.02 | 0.02 |
| Cloves oil | 0.002 | 0.002 |
| Vanilla tincture | 0.017 | 0.017 |
| Cinnamon oil | 0.001 | 0.001 |
| Menthyl-2-pyrrolidone-5-carboxylate | — | 0.20 |
| Water up to | 100 | 100 |

When one brushes the teeth with Formula A he experiences a minty-wintergreen flavour and a cooling sensation which remains in the mouth for a relatively short time after brushing. When one brushes the teeth with Formula B, a representative oral composition of this invention, one experiences a minty-wintergreen flavour and a cooling sensation which persists in the mouth much longer than the cooling sensation imparted by Formula A.

EXAMPLE XIII

Toothpaste

Toothpaste compositions are prepared according to the following formula having menthol present in one formula and a molar equivalent amount of menthyl pyrrolidone carboxylate in the other.

|  | Parts by weight | |
| --- | --- | --- |
|  | A | B |
| Aluminium hydroxide [Al(OH)$_3$] | 42.50% | 42.50 |
| Alumina (Al$_2$O$_3$) | 2.00 | 2.00 |
| Glycerol | 28.00 | 20.00 |
| Water | 24.50 | 24.50 |
| Sodium lauryl sulfoacetate | 1.00 | 1.00 |
| Tragacanth | 0.50 | 0.50 |
| Methyl p-hydroxy benzoate | 0.10 | 0.10 |
| Saccharin (soluble) | 0.05 | 0.05 |
| Natural anethole | 0.25 | 0.25 |
| Synthetic anethole | 0.25 | 0.25 |
| Ceylon cinnamon oil | 0.10 | 0.10 |
| Cloves oil | 0.05 | 0.05 |
| Coriander oil | 0.2 | 0.2 |
| Liquorice | 0.25 | 0.25 |
| Sweet fennel | 0.15 | 0.15 |
| Bitter fennel | 0.15 | 0.15 |
| Tarragon | 0.05 | 0.05 |
| Lemon | 0.05 | 0.05 |
| Menthyl-2-pyrrolidone-5-carboxylate | 0.40 | 0 |
| Brazil menthol | 0 | 0.232 |
| Alcohol | 0 | 0.168 |

When one brushes the teeth with Formula B one experiences an aniseed flavour with a minty overtone and a cooling sensation which remains about 25 minutes after brushing. When one brushes the teeth with Formula A one experiences an aniseed flavour with no minty overtone and a cooling sensation which remains about 40 minutes after brushing.

EXAMPLE XIV

Mouthwash

A mouthwash in accordance with this invention is formulated as follows with menthol present in one formula and a molar equivalent amount of menthyl isonipecotate in the other.

|  | A | B |
| --- | --- | --- |
| Ethyl alcohol (95% in water) | 25 | 25 |
| Glycerol | 12 | 12 |
| Sodium saccharinate | 0.05 | 0.05 |
| Tween 20 | 7 | 7 |
| Water | 54.75 | 55.05 |
| Lemon | 0.4 | 0.4 |
| Menthol | 0 | 0.5 |
| Menthyl isonipecotate | 0.8 | 0 |

This mouthwash is diluted in water before it is used: 1 part A or B, 1 part water.

When one rinses the mouth with Formula B one experiences a lemon flavour with minty overtone and a cooling sensation which remains about 20 minutes.

When Formula A is used one finds no minty overtone, but a pure lemon flavour and a cooling sensation which remains about 40 minutes.

EXAMPLE XV

Margarine

To a commercially available margarine mixture 0.05% by weight of menthyl nipecotate was added and thoroughly mixed therewith. The taste of the mixture was subsequently compared with that of the commercially available margarine to which nothing had been added. The margarine mixture with menthyl nipecotate was found to have a cooler effect in the mouth than the same margarine to which nothing was added with a level of confidence of 95% by a panel of 10 persons.

EXAMPLE XVI

Chocolate Bonbons 250 g chocolate and 4 spoonfuls of water are melted. 75 g sugar, 3 egg-yolks and 0.35 g menthyl-2-pyrrolidone-5-carboxylate are subsequently introduced. The heating is continued and the mass mixed up to a smooth paste, after which the heating is stopped. The paste is allowed to stand until the consistency is such that truffles can be made.

The sensation of freshness without the smell of menthol blends very well with the flavour of chocolate.

EXAMPLE XVII

| Vanilla Ice-Cream | % by weight |
| --- | --- |
| Water | 63.30 |
| Skim milk solids | 10.50 |
| Sugar | 16.00 |
| Vegetable fat | 9.50 |
| Stabiliser | 0.18 |
| Emulsifier | 0.45 |
| Salt | 0.045 |
| Butter flavour | 0.02 |
| Vanillin | 0.01 |
| Colour | 0.006 |

The mixture was treated in a batch freezer. Together with the vanillin 0.04% menthyl tetrahydrofuroate was added. The (relatively warm-eating) icecream was tasted at a temperature of −7°C and compared with the same cream containing no menthyl tetrahydrofuroate. A cooling effect was observed over and above the normal effects and centred on the rear of the tongue and throat.

What is claimed is:

1. An ester of menthol and a heterocyclic carboxylic acid having the formula:

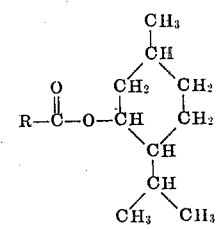

wherein R represents a radical derived by eliminating one H atom from the 3-, 4- or 5- position of 2- pyrrolidone or the 2-, 3- or 4- position of piperidine.

2. An ester according to claim 1 which is Menthyl-2-pyrrolidone-5-carboxylate.

3. An ester according to claim 1 which is Menthyl pipecolate.

4. An ester according to claim 1 which is Menthyl nipecotate.

5. An ester according to claim 1 which is Menthyl isonipecotate.

* * * * *